United States Patent [19]

Schempp

[11] Patent Number: 4,794,948
[45] Date of Patent: Jan. 3, 1989

[54] DIRECTIONAL CONTROL VALVE HAVING AN OPTICAL POSITION INDICATOR

[75] Inventor: Roland Schempp, Vaihingen, Fed. Rep. of Germany

[73] Assignee: Robert Bosch GmbH, Stuttgart, Fed. Rep. of Germany

[21] Appl. No.: 133,282

[22] Filed: Dec. 10, 1987

[30] Foreign Application Priority Data

Jan. 7, 1987 [DE] Fed. Rep. of Germany ....... 8700256

[51] Int. Cl.$^4$ ............................................. F16K 37/00
[52] U.S. Cl. .................................. 137/554; 251/129.15; 361/58; 361/91; 361/106; 361/165; 363/126; 363/142; 340/662
[58] Field of Search .................... 137/554; 307/22, 73; 323/239; 361/58, 88, 91, 103, 106, 165; 363/126, 142; 340/662; 251/129.15

[56] References Cited

U.S. PATENT DOCUMENTS

| | | | |
|---|---|---|---|
| 3,548,290 | 12/1970 | Swinehart | 323/239 |
| 3,603,843 | 9/1971 | Clements | 361/91 |
| 4,679,766 | 7/1987 | Cuming | 251/129.15 X |

Primary Examiner—John Rivell
Attorney, Agent, or Firm—Michael J. Striker

[57] ABSTRACT

A solenoid operated directional control valve includes a visual position indicator assembled of rectifying bridge circuit whose DC output terminals are bridged by a series connection of a light emitting diode with a PTC resistor. In this manner, the indicator is universally applicable both for DC and AC power sources and for a wide range of supply voltages.

9 Claims, 1 Drawing Sheet

DIRECTIONAL CONTROL VALVE HAVING AN OPTICAL POSITION INDICATOR

BACKGROUND OF THE INVENTION

The present invention relates in general to solenoid controlled directional control valves provided with visual indicators of their position.

It is known from prior art to indicate a momentary switching condition of a directional control valve by visual indicators such as for example lamps. The disadvantage of such prior art indicators is their dependency on predetermined working voltages, for example on DC or AC voltages on a predetermined voltage level. Accordingly for different voltages sets of corresponding indicator lamps are necessary and this requirement is disadvantageous both for the manufacture and for the application of the directional control valves.

SUMMARY OF THE INVENTION

It is, therefore, a general object of the present invention to overcome the aforementioned disadvantage.

More particularly, it is an object of this invention to provide a single visual indicating device which is applicable without modifications for a broad range of operating voltages of the solenoid controlled valve.

Another object of this invention is to provide such an improved visual indicator which requires only a small number of component parts which can be installed for example in the contact plug of the directional control valve.

Still another object of this invention is to provide such an improved visual indicating circuit which is safe against damage.

In keeping with these objects and with others which will become apparent hereafter, one feature of this invention resides in the provision of a visual position indicating device for a solenoid controlled directional control valve which includes four rectifying elements connected in a rectifying bridge circuit having input terminals for a power source and DC output terminals, and a series connection of an electrooptical indicating element with a temperature-dependent resistor connected across the output terminals.

In a preferred embodiment the rectifying elements are semi-conductive diodes, the electrooptical indicating element is a light emitting diode and the temperature-dependent resisitor has a positive temperature coefficient (PTC).

If the directional control valve is energized from an AC power source then a varistor is connected across the input terminals of the bridge circuit and the solenoid is connected parallel to the input terminals. If the valve is operated from a DC power source, then the solenoid is connected parallel to the output terminals.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENT

Figure 1:
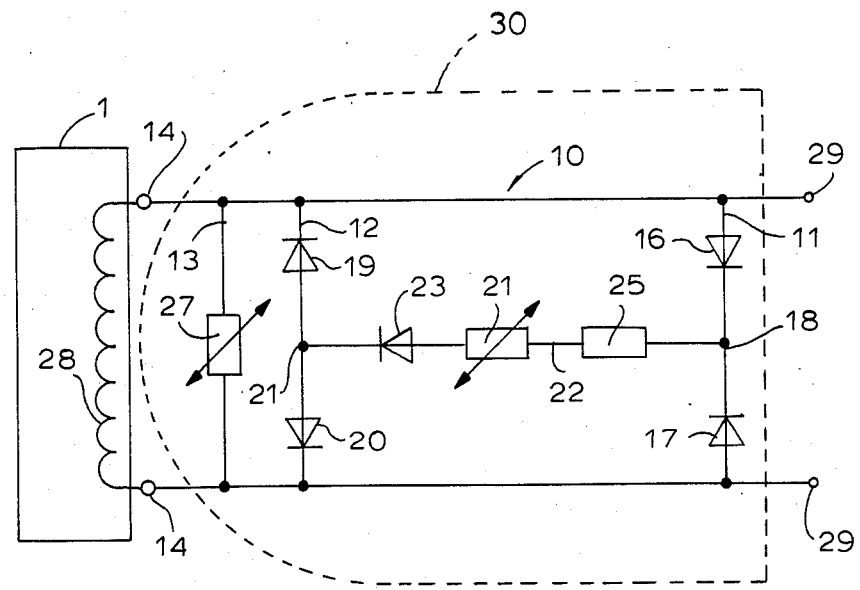
FIG. 1 illustrates a circuit diagram of an embodiment of the visual indicator of this invention.

In FIG. 1 reference numeral 10 indicates a rectifying bridge circuit whose branches 11 and 12 include rectifying diodes 16, 17 and 19, 20. Anodes of diodes 19 and 20 are connected to the negative output terminal 21 and cathodes of diodes 16 and 17 are connected to the positive output terminal 18 of the bridge. Cathode of the diode 19 and the anode of the diode 16 is connected to a power source input terminal 29 and the cathode of diode 20 and the anode of diode 17 is connected to the other power source input terminal. A connection of a light emitting diode 23, a temperature-series dependent PTC resistor 24 and a restricting ohmic resistor 25 are connected across the output terminals 18 and 21. The cathode of the LED 23 is connected to the negative output terminal 21. Instead of the light emitting diode an incandescent lamp can be used. The PTC resistor 24, due to its positive temperature coefficient, has a resistance characteristic which increases with increasing temperature. The PTC resistor 24 is made of a semiconductive material such as for example of a mixture of bariumtitanate with a metal oxide.

Figure 2:
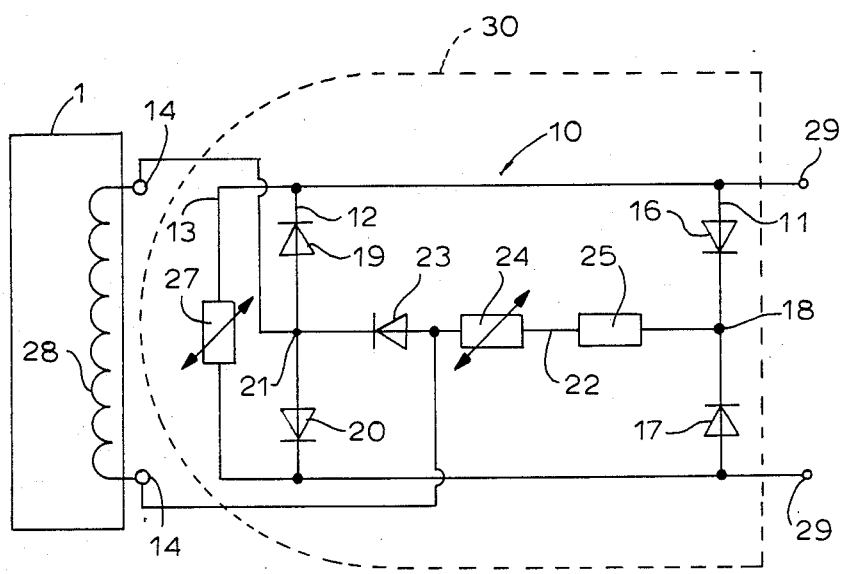
FIG. 2 shows another embodiment of this invention.

If the solenoid 28 of a positioning device of a directional control valve 1 is energized by an alternating current, then terminals 14 of the solenoid are connected parallel to the input terminals 29 of the rectifying bridge circuit 10. With advantage a varistor 27 is connected across the terminals 14 of the solenoid to reduce transient voltage peaks during the connection and disconnection of the solenoid and thus protecting the light emitting diode 23. If the solenoid 28 is to be energized from a DC power source and the bridge circuit is supplied with an AC voltage then the solenoid coil 28 is connected to output terminals 21 and 18 parallel to element 23 and in series with elements 24 and 25 as shown in FIG. 2.

When a direct current or alternating current voltage is applied to the input terminals of the rectifying bridge circuit 10, then always a unidirectional direct current flows through the series connection of the light emitting diode 23, PTC resistor 24 and ohmic resistor 25. Due to the current flow, the PTC resistor 24 heats up and with increasing temperature its ohmic resistance is also increased. In other words, the higher the applied voltage the faster increases the temperature and thus the resistance. As a consequence, a single light emitting diode 23 can be uniformly energized from a wide range of direct current or alternating current power supply voltages, for example from 12 Volts to 240 Volts. As a result, the uniformly designed visual indicating circuit of this invention is applicable for a large variety of types of solenoids for switching the directional control valves. The circuit due to its minute dimensions can be installed either in the contact plug 30 of the solenoid 28 or directly in a contact box of the housing of the directional control valve.

While the invention has been illustrated and described in connection with specific embodiments, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A solenoid controlled directional control valve having a visual indicator of its switching position, comprising four rectifying elements connected in a rectifying bridge circuit having input terminals for a power source and direct current output terminals; and a series connection of an electrooptical indicating element with a temperature-dependent resistor connected across said output terminals.

2. A directional control valve as defined in claim 1, wherein said rectifying elements are semiconductive diodes.

3. A directional control valve as defined in claim 2, wherein said series connection further includes an ohmic resistor.

4. A directional control valve as defined in claim 2, wherein said temperature-dependent resistor has a positive temperature coefficient.

5. A directional control valve as defined in claim 4, wherein a varistor is connected across said input terminals.

6. A directional control valve as defined in claim 5, wherein a solenoid of said directional control valve is connected across said input terminals.

7. A directional control valve as defined in claim 5, wherein a solenoid of said valve is connected to said output terminals.

8. A directional control valve as defined in claim 1, wherein said electrooptical indicating element is a light emitting diode.

9. A directional control valve as defined in claim 1, wherein said rectifying bridge circuits together with said series connection are installed in a contact plug for a power supply of a solenoid of said valve.

* * * * *